(12) United States Patent
Mittler et al.

(10) Patent No.: US 10,883,600 B2
(45) Date of Patent: Jan. 5, 2021

(54) TWO PART OIL CONTROL RING HAVING OIL PRESSURE EFFECT RIDGES

(71) Applicant: FEDERAL-MOGUL BURSCHEID GMBH, Burscheid (DE)

(72) Inventors: Richard Mittler, Burscheid (DE); Fabian Ruch, Leverkusen (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 142 days.

(21) Appl. No.: 16/306,090

(22) PCT Filed: Apr. 26, 2017

(86) PCT No.: PCT/EP2017/059855
§ 371 (c)(1),
(2) Date: Nov. 30, 2018

(87) PCT Pub. No.: WO2017/207172
PCT Pub. Date: Dec. 7, 2017

(65) Prior Publication Data
US 2019/0178380 A1 Jun. 13, 2019

(30) Foreign Application Priority Data
Jun. 1, 2016 (DE) .......................... 10 2016 110 131

(51) Int. Cl.
*F16J 9/20* (2006.01)
*F16J 9/06* (2006.01)

(52) U.S. Cl.
CPC ................ *F16J 9/206* (2013.01); *F16J 9/06* (2013.01); *F16J 9/20* (2013.01); *F16J 9/203* (2013.01)

(58) Field of Classification Search
CPC ...... F16J 9/061; F16J 9/062; F16J 9/20; F16J 9/203; F16J 9/206
See application file for complete search history.

(56) References Cited

U.S. PATENT DOCUMENTS

| | | | |
|---|---|---|---|
| 1,467,408 A | 9/1923 | Wilke | |
| 1,585,422 A | 5/1926 | Seifert | |
| 1,710,250 A * | 4/1929 | Wenzel | F16J 9/20 277/457 |
| 2,037,984 A * | 4/1936 | Johnson | F16J 9/203 277/462 |
| 2,048,258 A | 7/1936 | Godron | |
| 2,173,190 A * | 9/1939 | Wilkening | F16J 9/20 277/460 |
| 2,245,980 A | 6/1941 | Johnston | |
| 2,614,899 A * | 10/1952 | Phillips | F16J 9/203 277/444 |

(Continued)

FOREIGN PATENT DOCUMENTS

DE 102009036240 A1 2/2011

*Primary Examiner* — Nicholas L Foster
(74) *Attorney, Agent, or Firm* — Robert L. Stearns; Dickinson Wright, PLLC

(57) ABSTRACT

An oil wiper ring is provided having two circumferential shoulders, the running surfaces whereof are outwardly curved, wherein the shoulder of the combustion chamber side has an axial height greater by at least a factor of 2 than the axial height of the shoulder on the crankcase side and wherein the should on the combustion chamber side has an asymmetrical crowning.

3 Claims, 1 Drawing Sheet

(56) References Cited

U.S. PATENT DOCUMENTS

| | | | | |
|---|---|---|---|---|
| 2,951,732 | A * | 9/1960 | Brenneke | F16J 9/062 277/451 |
| 3,160,419 | A * | 12/1964 | Lohr | F16J 9/203 277/473 |
| 3,195,903 | A * | 7/1965 | Hesling | F16J 9/062 277/462 |
| 3,623,739 | A * | 11/1971 | Sugahara | F16J 9/062 277/463 |
| 3,677,558 | A * | 7/1972 | Sugahara | F16J 9/062 277/444 |
| 4,045,036 | A * | 8/1977 | Shunta | F16J 9/062 277/476 |
| 7,354,045 | B2 * | 4/2008 | Abe | F16J 9/062 277/435 |
| 9,234,479 | B2 * | 1/2016 | Feistel | F16J 9/062 |
| 9,810,175 | B2 * | 11/2017 | Feistel | F16J 9/062 |
| 2006/0006604 | A1 * | 1/2006 | Abe | F16J 9/20 277/434 |
| 2006/0102131 | A1 * | 5/2006 | Han | F16J 9/12 123/193.4 |
| 2013/0291824 | A1 * | 11/2013 | Feistel | F16J 9/062 123/193.6 |
| 2013/0307220 | A1 * | 11/2013 | Feistel | F16J 15/26 277/434 |
| 2019/0136976 | A1 * | 5/2019 | Mittler | F16J 9/206 |

* cited by examiner

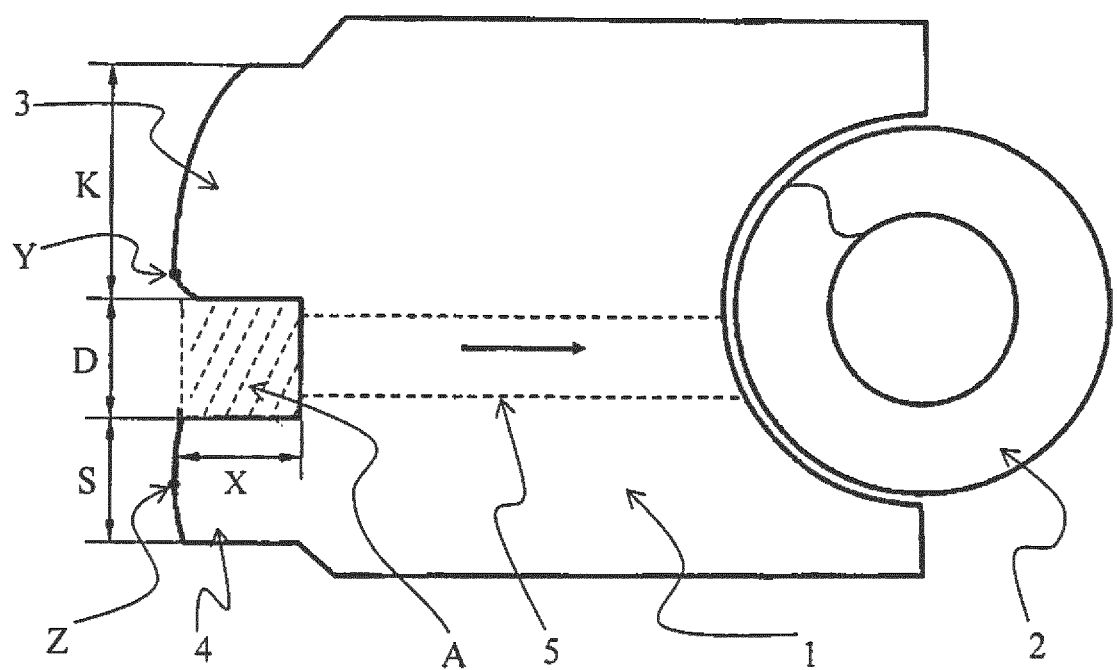

TWO PART OIL CONTROL RING HAVING OIL PRESSURE EFFECT RIDGES

BACKGROUND

1. Technical Field

The invention relates to piston rings, in particular to an oil wiper ring.

2. Related Art

One of the main problems in four-stroke engines is monitoring and sealing the piston ring piston system in respect of oil present in the crankcase; piston rings which are intended to seal the combustion chamber as effectively as possible from the crankcase oil are used for this purpose. It should be noted in this respect that a certain amount of oil is required in the system, in order to guarantee the functionality of the piston ring system in relation to friction and the sealing of gas from the combustion chamber. This defined oil volume should, on the one hand, be kept as small as possible, without otherwise inhibiting the hydrodynamic lubricating film on the piston ring running surface. In particular, the oil wiper ring must check that there is a perfect equilibrium between oil emissions, functionality and wear resistance.

Oil wiper rings, hereinafter also referred to in short as oil rings, are used in two or three-part designs in LVD, LVP HD engines. In the case of two-part rings, a ring carrier is designed with an internal spring which presses the external running surface against the cylinder wall. Two shoulders which scrape excess oil from the cylinder wall are arranged on the running surface of the piston ring, wherein openings in the form of bores or slots, for example, are located between the shoulders, which openings divert surplus oil from the outside to the inside of the piston ring. The shoulders are arranged in a symmetrical design in terms of their height and depth.

SUMMARY

The problem addressed by the present invention is that of further improving control over the oil volume present in the piston ring system and thereby reducing oil consumption, while simultaneously maintaining the functionality of the ring bundle.

The problem is solved according to the invention by an oil wiper ring comprising a ring carrier and an internal spring; wherein two shoulders with a groove located therebetween are arranged on the external running surface of the ring carrier in the direction of rotation; wherein openings are arranged which run radially from the groove to the inside of the ring carrier. In this case, the running surface regions of the shoulders are formed in a convexly crowned manner with pivot points, wherein the distance between the two pivot points and the ring axis is equal and the axial height of the shoulder on the combustion chamber side is greater by at least a factor of 2 than the axial height of the shoulder on the crankcase side.

According to one aspect of the present invention, the running surface region of the shoulder on the combustion chamber side may have an asymmetrically crowned design.

According to another aspect, the pivot point of the running surface region of the shoulder on the combustion chamber side may be arranged proximate to the groove at a distance of less than 25%, preferably less than 15%, of the axial height of the shoulder on the combustion chamber side.

According to a further aspect, the running surface region of the shoulder on the crankcase side may have a symmetrically crowned design and the pivot point may be arranged centrally in relation to the axial height of the shoulder on the crankcase side.

Standard terminology is followed in this case, in that axially relates to the corresponding direction of the piston, in other words the direction of the back-and-forth movement of the same, or to the corresponding axis of the piston cylinder. The ring axis is the axis running through the centre point of the ring in an axial direction which coincides in the installed state with the centre axis of the piston. A radial direction is, accordingly, a direction that runs parallel to the ring plane up to or away from the ring axis.

BRIEF DESCRIPTION OF THE DRAWING

Exemplary embodiments of the invention are described in greater detail below with reference to the FIGURE, wherein FIG. 1 shows an axial cross-sectional view of the oil wiper ring.

DETAILED DESCRIPTION

FIG. 1 shows an exemplary embodiment of an oil wiper ring according to the present invention as an axial cross-sectional view. The oil wiper ring has a two-part design with a ring carrier 1 and a ring-shaped internal spring 2, e.g. a tube spring, which presses the oil wiper ring in the installed state outwards against the cylinder wall. Two shoulders 3, 4 are arranged on the running surface region of the oil ring circumferentially in the direction of rotation, between which a depression in the form of a groove is located which is likewise arranged circumferentially in the direction of rotation, between which a depression in the form of a groove is located which is likewise arranged circumferentially in the direction of rotation and which has a face F in the axial cross-sectional view. Multiple openings 5, e.g. in the form of bores or slots, extend from the bottom of the groove in the direction of rotation to the inside of the ring carrier 1, so that no excess oil from the running surface region to the inside of the oil ring can flow away in the ring groove, whence it is then transferred through suitable outlets in the piston. The oil ring shown is characterized by an asymmetric running surface arrangement; the two shoulders 3, 4 differ sharply both in their axial height K, S and also in their running surface contour. The terms symmetrical and asymmetrical should be understood in this case in relation to the axial direction, i.e. within the meaning of mirror symmetry in relation to a plane that runs parallel to the ring plane, in other words perpendicularly to the axial direction. In the sectional representation in FIG. 1, this would be in relation to a horizontal line. In the direction of rotation, the ring is rotationally symmetrical, apart from the ring joint.

The shoulder 3 on the combustion chamber side has a sharply asymmetric convex crowning, i.e. the running surface is outwardly curved, wherein the curvature is greater proximate to the groove than the curvature proximate to the side of the shoulder which is facing the combustion chamber, in the FIGURE above. Proximate to the groove, the running surface therefore describes in an axial direction a relatively sharp bend, while on the other side it runs out in a relatively flat curve. The pivot point Y or also the "apex", i.e. the point which lies furthest to the outside in the radial direction and abuts the ring, in other words the cylinder wall, is situated proximate to the groove. The distance of the pivot point Y from the groove in an axial direction is preferably less than 25% of the axial height K of the shoulder 3 on the combustion chamber side, more preferably less than 15%, so that the pivot point Y is oriented sharply downwards in the direction of the crankcase. The choice of contour means that if too much oil has been introduced, it will simply overflow during an upstroke of the piston, as the asymmetric shape of the running surface of the shoulder 3 on the combustion chamber side means that oil can penetrate a relatively large area in the axial direction between the cylinder wall and the running surface of the shoulder and therefore causes a relatively large force which acts against the pressing force of the shoulder 3 on the cylinder wall. Conversely, the arrangement of the pivot point Y during an upstroke leads to a correspondingly good oil stripping action of the shoulder on the combustion chamber side. During the upstroke, the oil is held between the shoulders 3, 4 until a corresponding pressure drop causes the oil to flow through the openings 5 to the internal side of the ring carrier 1.

The shoulder 4 on the crankcase side is formed on the running surface with a relatively sharp convex crowning, i.e. the running surface has a relatively sharp curvature in the axial direction. "Relatively sharp" in this case should be understood with reference to the gently curved side of the running surface of the shoulder 3 on the combustion chamber side. The pivot point Z of the shoulder 4 on the crankcase side is located in an axial direction roughly halfway up the height S of the shoulder 4 on the crankcase side. In a radial direction, the arrangement of the pivot point Z of the shoulder 4 on the crankcase side corresponds to that of the pivot point Y of the shoulder 3 on the combustion chamber side, they are oriented with one another in an axial direction and are therefore located at the same distance from the axis of the ring and in the installed state they simultaneously abut the cylinder wall. This formation of the running surface means that a good stripping action is achieved in both directions by the shoulder 3 on the crankcase side: during a downstroke oil is stripped downwardly in the crankcase; during an upstroke the oil is held in the region between the shoulders.

The configuration of the running surfaces of the shoulders 3, 4 is made possible and supported in its action by the height difference between the two shoulders in an axial direction. The shoulder 3 on the combustion chamber side has an axial height K (control height) that is at least twice as great as the shoulder 4 on the crankcase side which has an axial height S (stripping height). This means that K>2·S.

In order to guarantee the function, the oil wiper ring is designed in such a manner, in particular the spring 2 is arranged in such a manner, that the centroid of area of the ring carrier 1, i.e. the centre of the outwardly directed force emanating from the spring, is located at axial height between the two pivot points Y, Z. Both running surfaces of the shoulders 3, 4 are then simultaneously pressed on the respective pivot points Y, Z on the cylinder wall. It is preferable in this case for roughly half the force to be transmitted over each of the two shoulders. However, an irregular division of force is also conceivable in order to counter the dynamic forces occurring during operation and to ensure a suitable pressing force on the cylinder wall in all operating states, so as to prevent one of the shoulders from being lifted off the cylinder wall during running, for example.

The groove which is located between the two shoulders 3, 4 is characterized by an axial height D, corresponding to the distance between the two shoulders, and a depth X. The volume of oil that can be held between the shoulders 3, 4 is determined by the recessed surface A=D·X of the groove, the volume is then obtained by multiplying by an average circumference of the groove.

This volume of the groove between the shoulders 3, 4 is crucial if a position is reached in which, on the one hand, sufficient oil reaches the piston ring system to guarantee the function of the piston rings and, on the other hand, not too much oil comes into the system, so that the smallest possible emission values can be observed. It has emerged that for this purpose the surface A should be proportional to the product of surface pressure $P_0$ and the sum of the ring shoulder heights K+S relative to a necessary through-flow factor $D_x$, wherein the surface pressure $P_0$ is the pressure with which the shoulders press against the cylinder wall, i.e. the force relative to the total area of the running surfaces of the shoulders:

$$A = P_O \cdot \frac{K+S}{D_x}$$

The numerical value of the through-flow factor $D_x$ is roughly 2 to 9 N/mm³. $D_x$ is obtained from the diverted volume flow and the density of the medium relative to the total running surface of the ring: $D_x = \rho/2 \cdot V^2 \cdot 1/Lh$; wherein $\rho$ is the density of the medium, V is the velocity of the volume flow and Lh is the linear height, i.e. the running length of the ring along the cylinder wall.

An embodiment of this kind leads to a reduction in oil consumption with simultaneous full functionality of the ring bundle. A reduction in shear forces between the shoulders is also achieved with a smaller oil volume.

The invention claimed is:

1. An oil wiper ring comprising a ring carrier and an internal spring;
    wherein two shoulders with a groove located therebetween are arranged on an external running surface of the ring carrier in the direction of rotation;
    wherein openings are arranged which run radially from the groove to an inside of the ring carrier;
    wherein the running surface regions of the shoulders are formed in a convexly crowned manner with pivot points, wherein an distance between the two pivot points and the ring axis is substantially equal; and
    wherein the axial height of the shoulder on the combustion chamber side is greater by at least a factor of 2 than the axial height of the shoulder on the crankcase side;
    wherein the running surface region of the shoulder on the combustion chamber side has an asymmetrically crowned design; and
    wherein the running surface region of the shoulder on the crankcase side has a symmetrically crowned design and wherein the pivot point is arranged centrally in relation to the axial height of the shoulder on the crankcase side.

2. The oil wiper ring according to claim 1, wherein the pivot point of the running surface region of the shoulder on the combustion chamber side is arranged proximate to the groove at a distance of less than 25% of the axial height of the shoulder on the combustion chamber side.

3. The oil wiper ring according to claim 2, wherein the distance is less than 15%.

* * * * *